United States Patent
Estrada et al.

(10) Patent No.: US 7,496,049 B2
(45) Date of Patent: Feb. 24, 2009

(54) METHOD AND SYSTEM USING ARP CACHE DATA TO ENHANCE ACCURACY OF ASSET INVENTORIES

(75) Inventors: Hugo Alexander Estrada, Leander, TX (US); David Bruce Kumhyr, Austin, TX (US); William E. Virun, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 690 days.

(21) Appl. No.: 11/105,609

(22) Filed: Apr. 14, 2005

(65) Prior Publication Data

US 2006/0233179 A1 Oct. 19, 2006

(51) Int. Cl.
*H04L 12/26* (2006.01)

(52) U.S. Cl. .................. 370/252; 370/270; 370/400; 709/224

(58) Field of Classification Search .................. None
See application file for complete search history.

(56) References Cited

U.S. PATENT DOCUMENTS

| | | | |
|---|---|---|---|
| 6,220,768 B1 * | 4/2001 | Barroux | 709/224 |
| 6,360,260 B1 | 3/2002 | Compliment et al. | 709/224 |
| 6,507,869 B1 * | 1/2003 | Franke et al. | 709/224 |
| 2002/0078382 A1 * | 6/2002 | Sheikh et al. | 713/201 |
| 2002/0124079 A1 | 9/2002 | Pulsipher | 709/224 |
| 2003/0005092 A1 * | 1/2003 | Nelson et al. | 709/220 |
| 2003/0061339 A1 * | 3/2003 | Benfield et al. | 709/224 |
| 2003/0145083 A1 | 7/2003 | Cush et al. | 709/224 |
| 2004/0093408 A1 * | 5/2004 | Hirani et al. | 709/224 |

* cited by examiner

*Primary Examiner*—Daniel J Ryman
*Assistant Examiner*—Tito Pham
(74) *Attorney, Agent, or Firm*—Duke W. Yee; Jill A. Poimboeuf; Wayne P. Bailey

(57) ABSTRACT

A technique for improving accuracy in an inventory containing assets associated with a network. Information pertaining to computer devices connected to a specified network is updated. Each device sends packets through at least one router in a set of routers, and each packet contains an element uniquely identifying its sending computer device. An inventory is maintained that identifies at least some of the computer devices as assets of an entity associated with the network. Data is acquired from ARP caches that are located within the routers. The acquired cache data is processed to detect all of the identifying elements that identify computer devices of the group. A database is constructed from information in the cache data that pertains to the detected identifying elements. Information contained in the database is compared with information contained in the inventory to update the inventory.

10 Claims, 4 Drawing Sheets

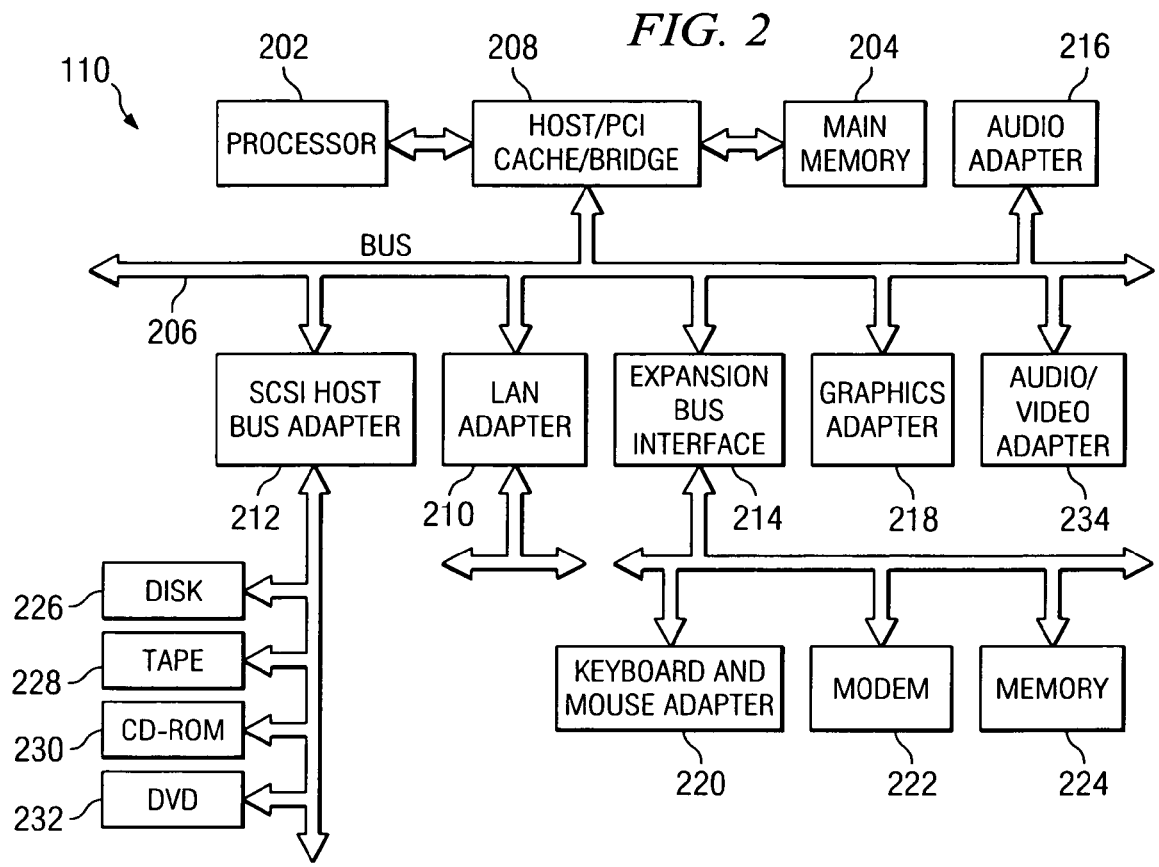
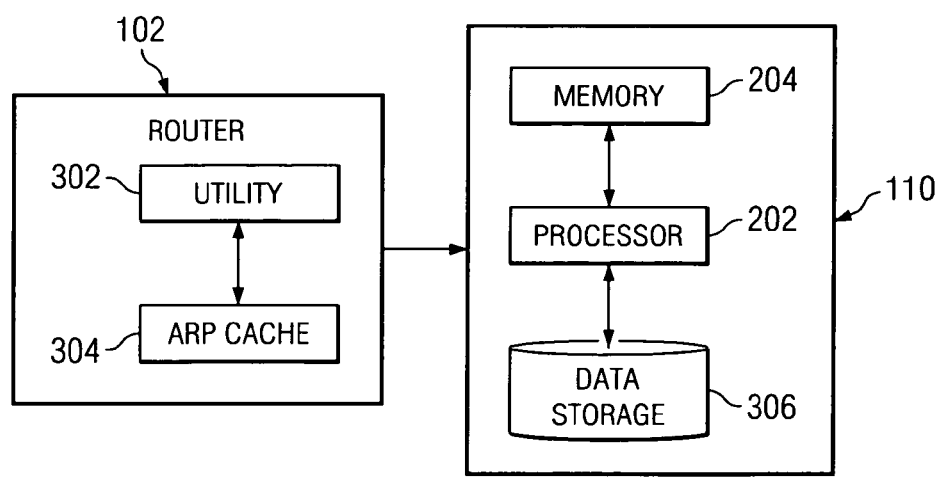

METHOD AND SYSTEM USING ARP CACHE DATA TO ENHANCE ACCURACY OF ASSET INVENTORIES

BACKGROUND OF THE INVENTION

1. Field of the Invention

The invention disclosed and claimed herein generally pertains to a method and system for updating and enhancing accuracy of an inventory of assets used for data transmissions. More particularly, the invention pertains to a method of the above type wherein respective inventory assets comprise computer devices operable to transmit data packets through networks or sub-networks that include one or more routers. Even more particularly, the invention pertains to a method of the above type wherein data contained in Address Resolution Protocol (ARP) caches respectively associated with the routers is used to improve the accuracy of data in the asset inventory.

2. Description of Related Art

It has become very common for organizations to have significant computer-related assets for sending and receiving data over communications networks such as the Internet. Assets of this type may include, by way of example and not limitation, devices such as desktop computers, laptop computers and servers. Typically, organizations will continually seek to maintain accurate inventories of these types of assets, due to their value and importance. Organizations generally will also want to ensure that such assets are being fully and efficiently utilized.

Many assets of the above type tend to be highly portable. As a result, as changes occur in an organization over time, and as employees are moved from one location to another, inventory records pertaining to such assets can become increasingly inaccurate. Some of the assets shown by the inventory will in fact no longer be available. As a further deficiency, devices that are actually being used for network communications will not be listed in the inventory. Problems of these types may be particularly significant in large organizations.

It would be very beneficial to provide an efficient and convenient technique for detecting inaccuracies in an inventory listing the computer-related assets of an organization. It would be of further benefit if inventory inaccuracies could be detected and corrected on a continuing basis. It would also be useful if levels of use and activity of respective assets in the inventory could periodically be tracked or monitored.

SUMMARY OF THE INVENTION

The invention generally provides a method and system for improving accuracy in an inventory containing assets of the type described above. In one embodiment, a method is provided for updating information pertaining to computer devices in a group of devices connected to a specified transmission network. Each device is disposed to transmit packets through at least one router in a set of interconnected routers, and each packet contains an element uniquely identifying its transmitting computer device. The method includes the step of maintaining an inventory record that includes information identifying at least some of the computer devices as assets of an entity associated with the set of routers. The method further includes acquiring data contained in one or more ARP caches, at selected intervals, wherein each ARP cache is operatively associated with one of the routers. The acquired cache data is processed to detect all of the identifying elements contained therein that respectively identify computer devices of the group. A database is then constructed from information in the acquired cache data that pertains to respective detected identifying elements. Information contained in the database is compared with information contained in the inventory, and results of the comparison are selectively employed to update the inventory record.

BRIEF DESCRIPTION OF THE DRAWINGS

FIG. 2 is a block diagram showing a computer or other data processing system that may be used in implementing an embodiment of the invention.

FIG. 3 is a block diagram showing selected components of FIG. 1 in greater detail.

DETAILED DESCRIPTION OF THE PREFERRED EMBODIMENT

Figure 1:
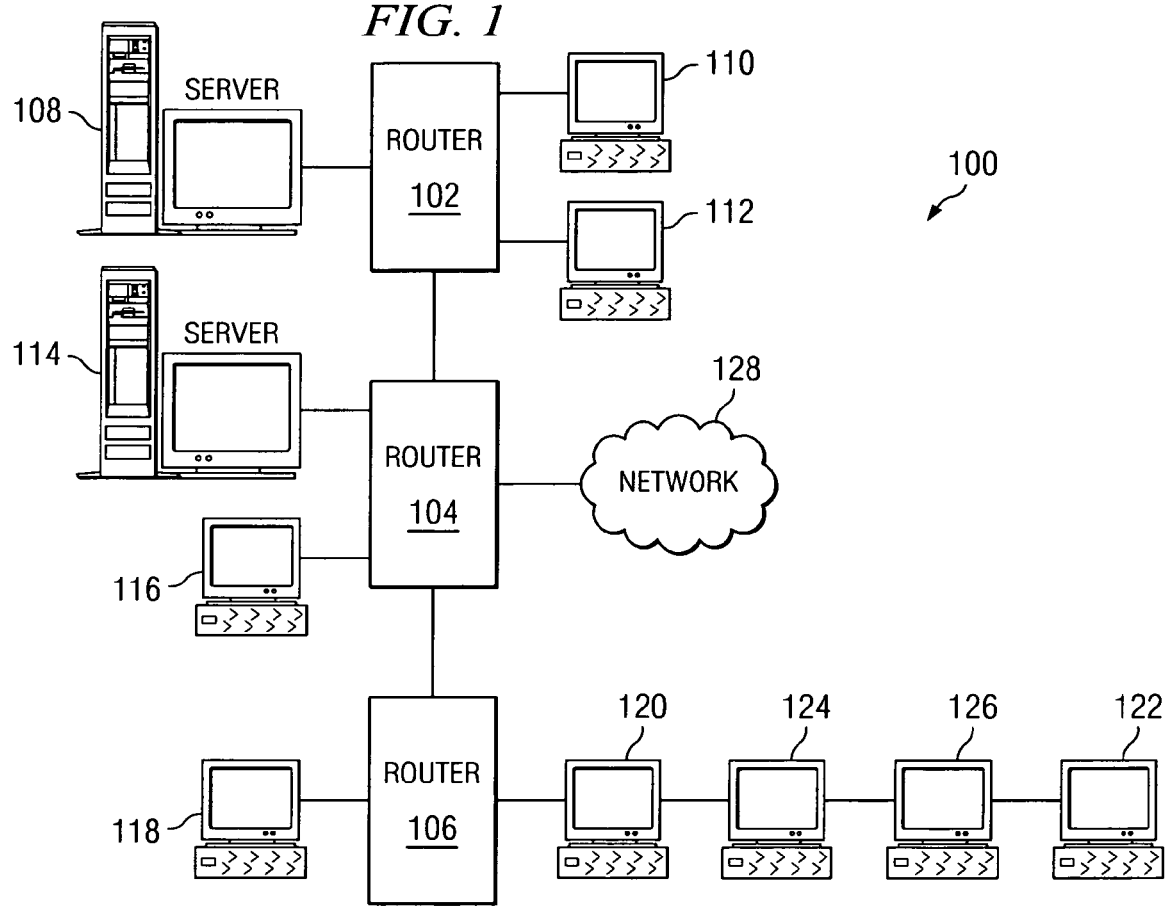
FIG. 1 is a schematic diagram showing a network including routers and other components used in implementing an embodiment of the invention.

Referring to FIG. 1, there is shown a network 100 of a type that is commonly set up and used by a sizable organization, such as a large business or other entity. Network 100 includes routers 102-106, although a different number of routers could be used in other similar networks. Each router has a number of computer devices of varying type connected to it, wherein the computer devices may collectively form a sub-network or local area network (LAN). More particularly, computer devices 108-112 are connected to router 102, devices 114-116 are connected to router 104 and devices 118-126 are connected to router 106. Router 104 is additionally connected to an external network 128, such as the Internet.

As is well known by those of skill in the art, routers are very commonly used to direct data communications or traffic between their respective commuter devices, with other routers, or with external networks such as network 128. Device 110 comprises a computer such as a desktop computer, and devices 108 and 114 are shown to comprise servers or server racks. Remaining computer devices 112 and 116-126 are intended to be representative of a range of devices used to transmit and receive data packets through their respective routers. Thus, as used herein, the term "computer device" can include desktop computers, laptop computers and server components, but is not limited thereto and may in fact include other devices as well.

All of the computer devices connected to transmit data through any of the routers of network 100, regardless of type, are considered to be assets of the organization or entity that controls or is otherwise associated with network 100. Typically, the organization would maintain an inventory of all such computer device assets. Continually monitoring, updating and correcting this inventory, to ensure its accuracy, would generally be an important ongoing task for the organization.

With reference now to FIG. 2, a block diagram of computer 110, or like data processing system in which the present invention may be implemented, is illustrated. Computer 110 employs a peripheral component interconnect (PCI) local bus architecture. Although the depicted example employs a PCI bus, other bus architectures, such as Micro Channel and ISA, may be used.

Processor 202 and main memory 204 are connected to PCI local bus 206 through PCI bridge 208. PCI bridge 208 may also Include an integrated memory controller and cache memory for processor 202. Additional connections to PCI local bus 206 may be made through direct component interconnection or through add-in boards. In the depicted example, local area network (LAN) adapter 210, SCSI host bus adapter 212, and expansion bus interface 214 are connected to PCI local bus 206 by direct component connection.

In contrast, audio adapter 216, graphics adapter 218, and audio/video adapter (A/V) 234 are connected to PCI local bus 206 by add-in boards inserted into expansion slots. Expansion bus interface 214 provides a connection for a keyboard and mouse adapter 220, modem 222, and additional memory 224.

In the depicted example, SCSI host bus adapter 212 provides a connection for hard disk drive 226, tape drive 228, CD-ROM drive 230, and digital video disc read only memory drive (DVD-ROM) 232. Typical PCI local bus implementations will support three or four PCI expansion slots or add-in connectors.

An operating system runs on processor 202 and is used to coordinate and provide control of various components within computer 110 in FIG. 2. The operating system may be a commercially available operating system, such as OS/2, which is available from International Business Machines Corporation. _OS/2_ is a trademark of International Business Machines Corporation.

An object oriented programming system, such as Java, may run in conjunction with the operating system, providing calls to the operating system from Java programs or applications executing on computer 110. Instructions for the operating system, the object-oriented operating system, and applications or programs are located on a storage device, such as hard disk drive 226, and may be loaded into main memory 204 for execution by processor 202.

Those of ordinary skill in the art will appreciate that the hardware in FIG. 2 may vary depending on the implementation. The depicted example is not meant to imply architectural limitations with respect to the present invention. For example, the processes of the present invention may be applied to multiprocessor data processing systems.

Referring to FIG. 3, there is shown router 102 connected in operative relationship with computer device 110, or reasons described hereinafter in further detail. As is well known in the art, every data packet transmitted to router 102 by one of the computer devices connected thereto has a header containing certain information. As further described in connection with FIG. 4, this information includes the media access control (MAC) address of the computer device that sent the packet. Thus, the MAC address comprises an identifying element that uniquely identifies the sending computer device. Moreover, FIG. 3 shows router 102 provided with an address resolution protocol (ARP) cache 304. After the router receives a packet from a computer device for retransmission elsewhere, the information in the packet header is stored in the ARP cache 304, for some period of time.

FIG. 3 further shows router 102 provided with an ARP utility or agent 302 that generally has control over cache 304 and access to the header data stored therein. Typically, the contents of ARP cache 304 are periodically flushed or removed from the cache, such as at two-day or four-day intervals.

It is to be understood that routers 104 and 106 have utilities and ARP caches similar to the utility 302 and cache 304, respectively, of router 102. Also in like manner with router 102, routers 104 and 106 use their ARP caches to store header information received with packets sent from their respective computer devices. Their packet contents are also flushed periodically.

In accordance with the invention, it has been recognized that if the data contents of the router 102 ARP cache 304 could be copied or acquired before the cache was flushed or emptied, such data could be used to identify each computer device that is connected to router 102 to transmit data. Moreover, if the contents from the ARP caches could be copied from all other routers included in network 100, such as routers 104 and 106, all computer devices included in network 100 could be identified. Thus, referring further to FIG. 3, there is shown computer device 110 connected to router 102 to periodically take snapshots of the contents of ARP cache 304.

It is to be understood that the term "taking a snapshot" (and variations thereof), as used herein, means acquiring some or all of the data contents of a router ARP cache at a specified time. As shown by FIG. 3, this procedure may be carried out by operating processor 202 of computer device 110 in connection with ARP utility 302 of router 102. More particularly, under the direction of instructions in memory 204, processor 202 would act to acquire a copy of all data in ARP cache 304 at specified times, and then enter the copied data into a data storage device 306 within computer 110. Storage device 306 could comprise, for example, the hard disk 226 of computer device 110. The periodicity of the cache data acquisitions would be determined by the timing of successive ARP cache flush events. Thus, computer device 110 would be operated to ensure that a snapshot of the ARP cache data 304 was always taken before a particular set of contents was flushed from the cache.

While FIG. 3 shows router 102 connected to computer 110 for data acquisition, it is to be understood that computer 110 would also periodically take snapshots of the ARP cache contents of all other routers included in network 100. Thus, identifying information pertaining to all the computer devices connected to network 100 would periodically be collected in data storage 306 of computer 110.

Figure 4:
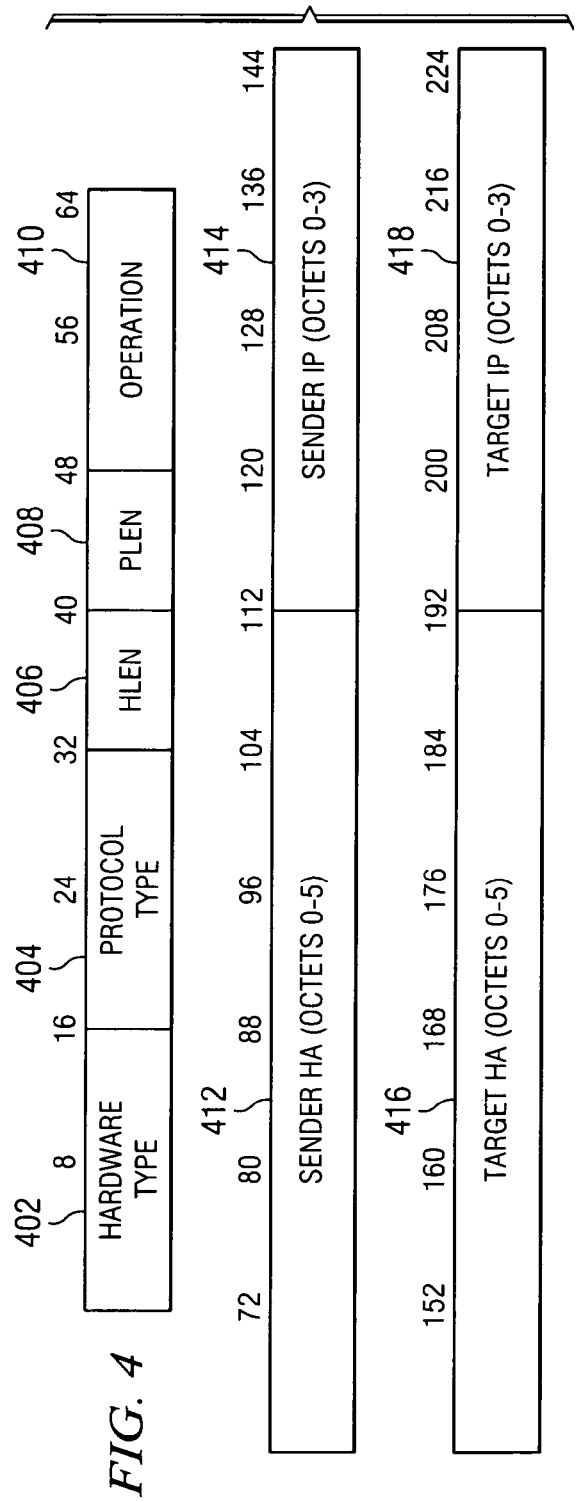
FIG. 4 is a schematic diagram illustrating packet header information that may be used in implementing an embodiment of the invention.

Referring to FIG. 4, there is shown a diagram illustrating the header information stored or entered in the ARP cache of router 102 or the like. Each of the data entries shown in FIG. 4 is made in response to the routing of a packet through a router from a computer device such as 108-126 of FIG. 1. Respective entries include hardware type 402, protocol type 404, HLEN 406, PLEN 408, operation 410, sender hardware address (HA) 412, sender IP 414, target hardware address HA 416, and target IP 418.

Hardware type 402 is the type of adapter, such as an Ethernet adapter, that is being used, and protocol type 404 is the type of protocol being used to transmit messages. In these examples, the protocol type is IP. HLEN 406 is the length in bytes of the hardware address, while PLEN 408 is the length in bytes of the protocol address. Operation 410 indicates the type of operation being performed, such as a request or a reply. Sender IP 414 is the IP source address. The target hardware address 416 is the MAC address for an adapter in the target node, and target IP 418 is the destination address for the packet.

Sender hardware address 412 is a MAC address which is included in a packet from the computer device transmitting the packet. A MAC address is a unique serial number that is associated with an adapter to identify that adapter from all others on a network. Accordingly, the computer devices of network 100 could be uniquely identified by their respective MAC addresses. Each MAC address, in turn, uniquely identifies a specific network interface card (NIC) attached to a specific computer device.

In view of the above teachings, FIG. 3 is again referred to. After the contents of respective router ARP caches have been copied into data storage 306, processor 202 of computer device 110 is operated to search data storage 306 for all sender MAC addresses 412. The sender MAC addresses found during the search are then used by processor 202 of computer device 110 to construct a MAC address database.

Figure 5:
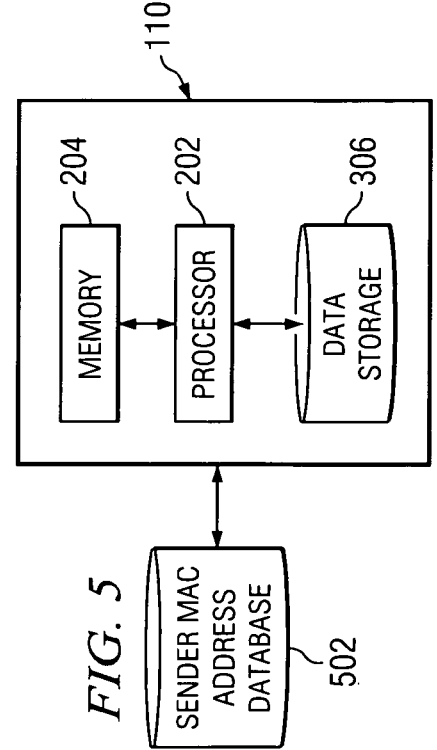
FIG. 5 is a schematic diagram further illustrating components for implementing an embodiment of the invention.

Referring to FIG. 5, there is shown one such sender MAC address database 502. In addition to providing a list or record of each sender MAC address 412 discovered by computer 110 in the ARP cache data, database 502 may also include supplementary information pertaining to each MAC address. For example, the database 502 may show the most recent time that a packet was sent by each device identified by a listed MAC address. The data base 502 may also indicate the number of packets sent by each of such devices during a specified period of time. This information could be used to indicate the level of activity of the computer devices respectively associated with the listed MAC addresses. Finally, database 502 could contain information indicating the router associated with each packet sending a MAC address. The router information could show respective physical locations of the corresponding computer devices.

Figure 6:
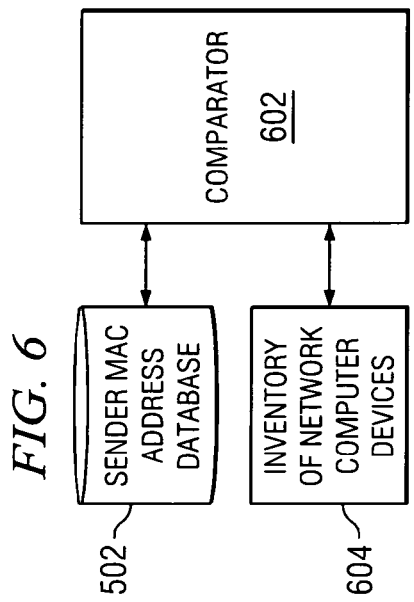
FIG. 6 is a schematic diagram showing a MAC address database, an asset inventory and a comparator for use in implementing an embodiment of the invention.

Referring to FIG. 6, there is shown the MAC address database 502 connected to a comparator 602. Also connected to comparator 602 is an inventory 604. Inventory 604 comprises a record or list of all computer devices that are considered to be or intended to be assets available for connection to network 100. Inventory 604 is also provided with a list of the MAC addresses that respectively correspond to the computer devices included on the inventory. Thus, comparator 602 may be operated to compare the list of MAC addresses in inventory 604 with the MAC addresses contained in database 502. Comparator 602 usefully comprises computer device 110, configured to perform comparison and analysis tasks as described herein.

In comparing the MAC addresses in database 502 and inventory 604, one result could be that a particular MAC address in the inventory was not found in database 502, or at least was not found recently. This would suggest that the device identified by the MAC address was no longer being used in network 100, for some reason. Database 502 could be queried to determine the most recent time that a packet with the particular MAC address was transmitted from a router of network 100. This information could then be sent to the manager or administrator of the inventory for further investigation, and for correction of the inventory if necessary.

A further result of comparison could be that a MAC address actually used to transmit packets, as shown by database 502, was found to be not listed in the inventory 604. This could indicate an error in the inventory that needed correcting. It could also suggest that an unauthorized device was being used to send data through network 100. Accordingly, this result would also be sent to the asset administrator for further investigation, together with information pertaining to packet transmission times and the routers used to send packets with the MAC address.

The inventory 604 could be Further configured to show patterns of use associated with respective computer device assets identified therein. A pattern could indicate, for example, the frequency of packet transmissions to be expected by a particular computer device, or the router or routers to which the device should be connected. Comparator 602 could then use data in database 502 to detect a variation from the pattern expected for a particular computer device that was significant enough to warrant investigation.

Figure 7:
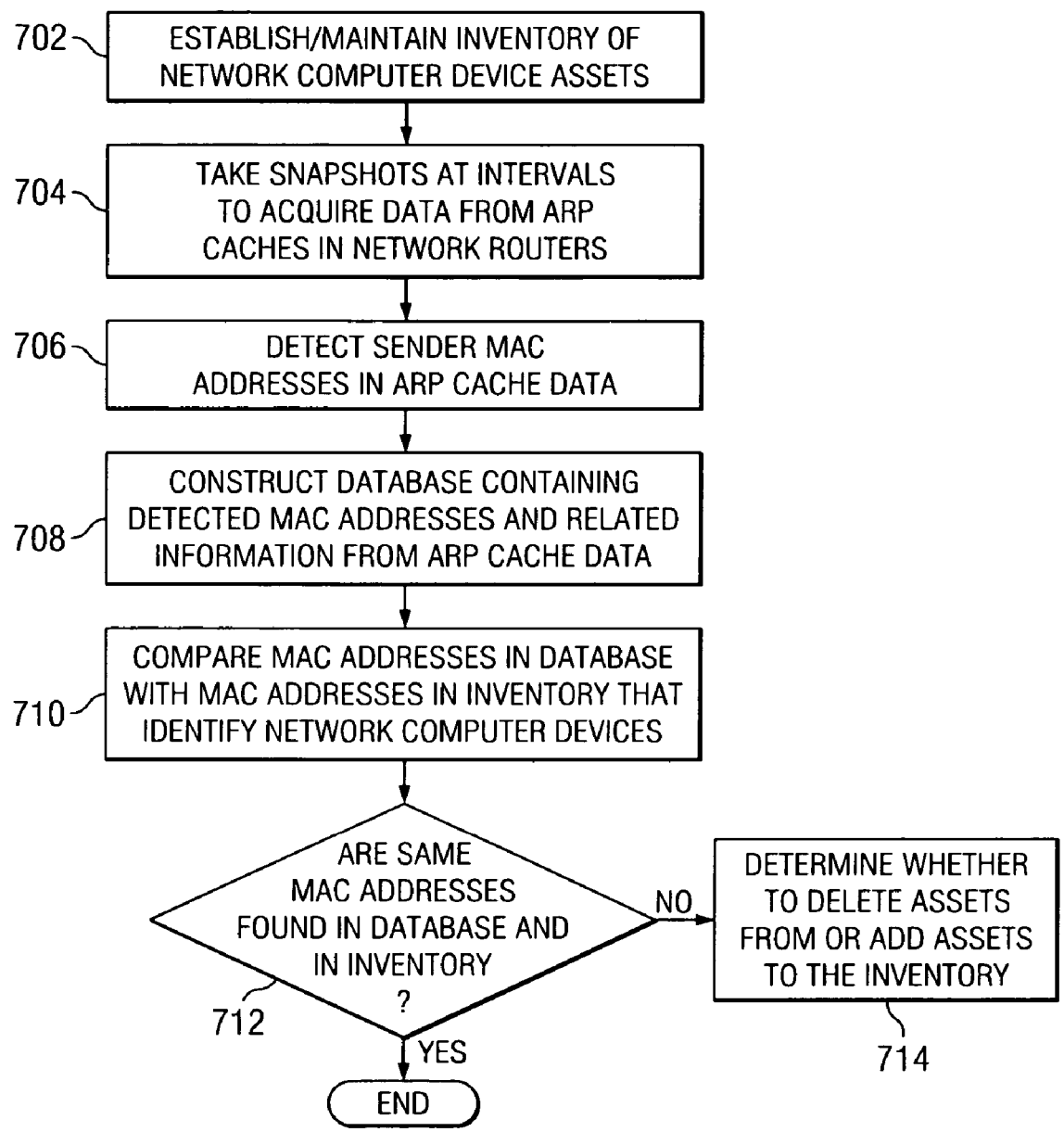
FIG. 7 is a flow chart illustrating successive steps of an embodiment of the invention.

Referring to FIG. 7, there is shown a flow chart depicting an embodiment of the invention. Function block 702 of FIG. 7 indicates that an inventory is maintained to show respective computer device assets that are known or believed to be used with a network or system. Function block 704 shows that snapshots are periodically taken, to acquire data from ARP caches in respective routers of the network. In accordance with function blocks 706 and 708, the acquired data is searched to detect sender MAC addresses, indicating computer devices that transmit data into the network. A database is then constructed, showing detected MAC addresses and related information such as transmission times of associated data packets.

Referring further to FIG. 7, function block 710 shows that respective MAC addresses in the database are compared with MAC addresses in the inventory that identify respective computer devices listed therein. Decision block 712 indicates that if the two sets of MAC addresses match exactly, the process shown in FIG. 7 is ended. However, function block 714 shows that if there is not an exact match of MAC addresses, further analysis is required. If the inventory contains computer devices not shown by MAC addresses in the database, it may be that some assets have become unavailable and should be deleted from the Inventory. On the other hand, if MAC addresses in the database are not found in the inventory, the corresponding computer devices may need to be added to the inventory.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media.

The Description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for selectively updating information pertaining to computer devices in a group of said computer devices connectible to a specified transmission network, wherein each device is disposed to transmit packets to a router in a set of routers included in said network and each packet contains an element uniquely identifying its transmitting computer device, said method comprising the steps of:

maintaining an inventory that includes information identifying at least some of said computer devices as assets of an entity associated with said specified network;

acquiring data contained in one or more ARP caches at selected intervals, wherein each of said ARP caches is associated with one of said routers, wherein said step of acquiring data comprises taking snapshots, by the data processing system, of data contents of respective ARP caches at selected intervals to form acquired cache data at the data processing system, and wherein said intervals are respectively selected to ensure that each of said snapshots is taken before the data contents of the respective ARP caches are removed by periodic flush events;

processing said acquired cache data to detect all of said elements contained therein that respectively identify said computer devices to form detected identifying elements, wherein said detected identifying elements comprise respective MAC addresses for said computer devices, wherein said processing step comprises detecting each MAC address that is contained in said acquired cache data;

constructing a database from said acquired cache data that includes said detected identifying elements, and further includes information indicating prior use of each computer device identified by said detected identifying elements, wherein the prior use includes (i) a first indicator of a transmission time of a most recent packet sent by each computer device identified by one of said detected MAC addresses, (ii) a second indicator of a number of packets sent by said each computer device during a specified period of time, and (iii) router information indicating what respective router is associated with said each MAC address; and comparing information contained in said database with information contained in said inventory, and selectively using results of said comparison to update said inventory (i) to identify the computer devices associated with the entity, and (ii) to indicate a level of activity for the computer devices associated with the entity.

2. The method of claim 1, wherein:

the contents of said ARP caches at one of said intervals include elements identifying each of the computer devices that have sent packets to said routers since the last flush event.

3. The method of claim 1, wherein:

an inventory administrator is notified when the identifying element of a particular computer device included in said inventory has not been detected in said acquired cache data at any time during a period of pre-specified length.

4. The method of claim 3, wherein:

said inventory administrator is notified when an identifying element is detected in said acquired cache data that identifies a computer device not included in said inventory.

5. The method of claim 4, wherein:

said inventory is updated to delete a computer device therefrom or to add a computer device thereto, selectively, in response to results of said comparison.

6. The method of claim 1, wherein:

all of said acquired cache data is directed to a central location for selective processing.

7. A computer recordable-type medium encoded with computer executable instructions and operable by a data processing system for selectively updating information pertaining to computer devices in a group of said computer devices connectible to a specified transmission network, wherein each device is disposed to transmit packets to a router in a set of routers included in said network and each packet contains an element uniquely identifying its transmitting computer device, said computer recordable-type medium comprising:

first instructions for maintaining an inventory that includes information identifying at least some of said computer devices as assets of an entity associated with said specified network;

second instructions for acquiring data contained in one or more ARP caches at selected intervals, wherein each of said ARP caches is associated with one of said routers, wherein said second instructions for acquiring data comprises sub-instructions for taking snapshots, by the data processing system, of data contents of respective ARP caches at selected intervals to form acquired cache data at the data processing system, and wherein said intervals are respectively selected to ensure that each of said snapshots is taken before the data contents of the respective ARP caches are removed by periodic flush events;

third instructions for processing said acquired cache data to detect all of said elements contained therein that respectively identify said computer devices to form detected identifying elements, wherein said detected identifying elements comprise respective MAC addresses for said computer devices, wherein said third instructions for processing comprises sub-instructions for detecting each MAC address that is contained in said acquired cache data;

fourth instructions for constructing a database from said acquired cache data that includes said detected identifying elements, and further includes information indicating prior use of each computer device identified by said detected identifying elements, wherein the prior use includes (i) a first indicator of a transmission time of a most recent packet sent by each computer device identified by one of said detected MAC addresses, (ii) a second indicator of a number of packets sent by said each computer device during a specified period of time, and (iii) router information indicating what respective router is associated with said each MAC address; and fifth instructions for comparing information contained in said database with information contained in said inventory, and selectively using results of said comparison to update said inventory (i) to identify the computer devices associated with the entity, and (ii) to indicate a level of activity for the computer devices associated with the entity.

8. The computer recordable-type medium of claim 7, wherein:

said inventory is updated to delete a computer device therefrom or to add a computer device thereto, selectively, in response to results of said comparison.

9. Apparatus for selectively updating information pertaining to computer devices in a group of said computer devices connectible to a specified transmission network, wherein each device is disposed to transmit packets to a router in a set of routers included in said network and each packet contains an element uniquely identifying its transmitting computer device, said apparatus comprising:

a storage device for storing an inventory that includes information identifying at least some of said computer devices as assets of an entity associated with said specified network;

a first component for acquiring data contained in one or more ARP caches at selected intervals, wherein each of said ARP caches is associated with one of said routers, wherein said step of acquiring data comprises taking snapshots, by the data processing system, of data contents of respective ARP caches at selected intervals to form acquired cache data at the data processing system, and wherein said intervals are respectively selected to ensure that each of said snapshots is taken before the data contents of the respective ARP caches are removed by periodic flush events;

a processor adapted to process said acquired cache data to detect all of said elements contained therein that respectively identify said computer devices to form detected identifying elements, wherein said detected identifying elements comprise respective MAC addresses for said computer devices, wherein said processing step comprises detecting each MAC address that is contained in said acquired cache data;

a storage device for storing a database constructed from said acquired cache data that includes said detected identifying elements, and further includes information indicating prior use of each computer device identified by said detected identifying elements, wherein the prior use includes (i) a first indicator of a transmission time of a most recent packet sent by each computer device identified by one of said detected MAC addresses, (ii) a second indicator of a number of packets sent by said each computer device during a specified period of time, and (iii) router information indicating what respective router is associated with said each MAC address; and a second component for comparing information contained in said database with information contained in said inventory, and selectively using results of said comparison to update said inventory (i) to identify the computer devices associated with the entity, and (ii) to indicate a level of activity for the computer devices associated with the entity.

10. The apparatus of claim 9, wherein:

said inventory is updated to delete a computer device therefrom or to add a computer device thereto, selectively, in response to results of said comparison.

\* \* \* \* \*